(12) United States Patent
Tanaka et al.

(10) Patent No.: US 6,428,299 B1
(45) Date of Patent: Aug. 6, 2002

(54) APPARATUS FOR MANUFACTURING A GOLF BALL WITH AN INITIAL PREPARATORY FORM HAVING A SEAM

(75) Inventors: Hiroaki Tanaka; Yoshiyuki Okido; Yutaka Yoshida; Hideki Sano, all of Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 09/487,894

(22) Filed: Jan. 19, 2000

Related U.S. Application Data

(62) Division of application No. 08/890,990, filed on Jul. 10, 1997, now Pat. No. 6,036,907.

(30) Foreign Application Priority Data

Jul. 12, 1996 (JP) ............................................. 8-202943
Oct. 1, 1996 (JP) ............................................. 8-281430

(51) Int. Cl.[7] .............................................. B29C 33/42
(52) U.S. Cl. ........................ 425/116; 425/395; 425/408
(58) Field of Search ................................ 425/517, 112, 425/116, 125, 127, 395, 408; 264/248, 275

(56) References Cited

U.S. PATENT DOCUMENTS

| | | | |
|---|---|---|---|
| 1,157,420 A | 10/1915 | Roberts | |
| 2,287,270 A | 6/1942 | Partridge | 264/250 |
| 3,147,324 A * | 9/1964 | Ward | 264/254 |
| 3,350,252 A | 10/1967 | Twickler | 264/254 |
| 4,408,980 A | 10/1983 | Gallizia | 425/501 |
| 4,501,715 A | 2/1985 | Barfield et al. | 264/248 |
| 5,150,906 A | 9/1992 | Molitor et al. | 273/220 |

* cited by examiner

Primary Examiner—Jan H. Silbaugh
Assistant Examiner—Edmund H. Lee
(74) Attorney, Agent, or Firm—Armstrong, Westerman & Hattori, LLP

(57) ABSTRACT

A pair of unvulcanized half outer layer bodies are formed by metallic molds provided with first mold having a hemispherical convex portion and second mold having a hemispherical concave portion. A vulcanized inner core is put into either of half outer layer bodies, and a pair of half outer layer bodies are paired up to form a preparatory form which is to be vulcanization molded in metallic molds for vulcanization molding.

7 Claims, 9 Drawing Sheets

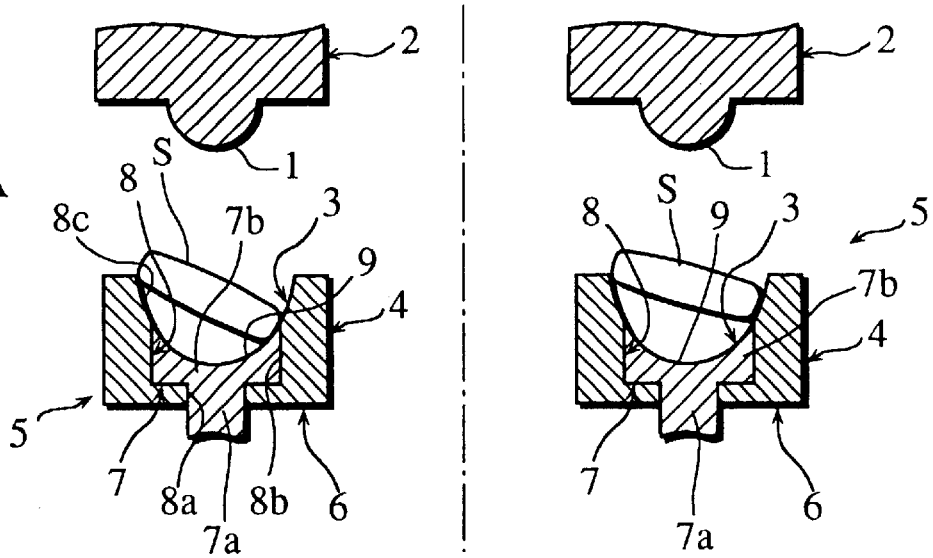
Fig. 1A
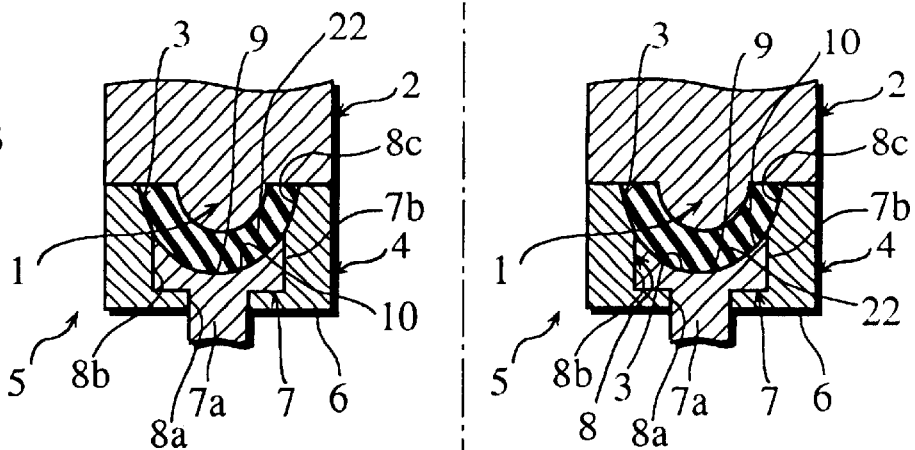
Fig. 1B
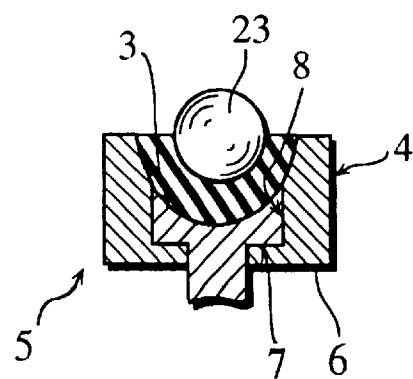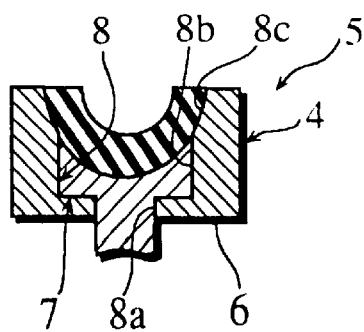
Fig. 1C

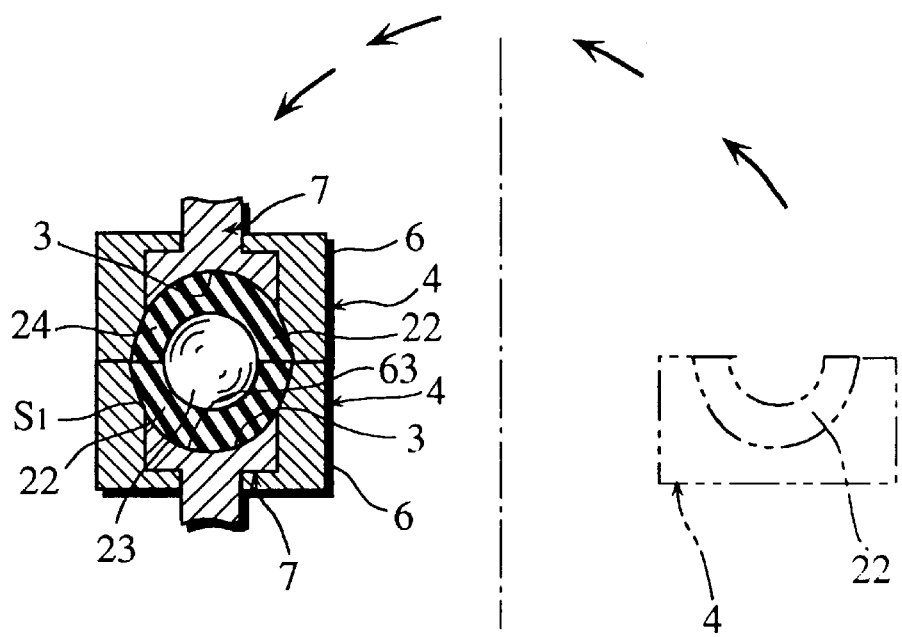
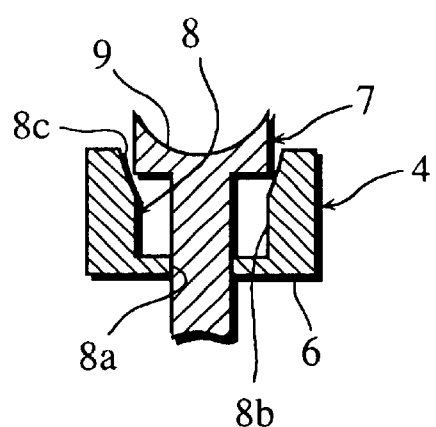
Fig. 2A
Fig. 2B

APPARATUS FOR MANUFACTURING A GOLF BALL WITH AN INITIAL PREPARATORY FORM HAVING A SEAM

This application is a Division of prior application Ser. No. 08/890,990 filed Jul. 10, 1997, now U.S. Pat. No. 6,036,907.

BACKGROUND OF THE INVENTION

1. Field of the Invention

This invention relates to an apparatus and a method for manufacturing a golf ball, especially a golf ball having a multilayer structure.

2. Description of the Related Art

There are conventional methods for manufacturing a multilayer golf ball, and three of the methods are shown as follows, for example.

A first method for manufacturing a golf ball comprises the steps of, vulcanization molding an inner core, retaining the inner core at a fixed position with a movable pin, injecting material which composes outer layer by an injection molding machine or a transfer metallic mold, pulling off the movable pin, and vulcanization molding the outer layer.

A second method for manufacturing a golf ball comprises the steps of forming a pair of unvulcanized half outer layer bodies by metallic molds, which consists of a hemispherical concave mold and a hemispherical convex mold (or forming a pair of half outer layer bodies by heating the half outer layer bodies which is unvulcanized for a fixed time so that not to shrink the half outer layer bodies), inserting an inner core vulcanization molded separately into the half outer layer bodies, and vulcanization molding the half outer layer bodies and the inner core.

A third method for manufacturing a golf ball is as set forth in the second method, wherein each of the outer layers are not shaped into hemispherical appearance but shaped in sheet appearance.

However the conventional methods described above are not suitable for manufacturing a golf ball having a multilayer structure.

When manufacturing a golf ball by the first method, a whole structure of the metallic mold apparatus is extremely complicated and a limitation of pressure for injecting material causes decrease of a number of golf balls to be produced per one press and makes the method unsuitable for mass production of golf balls. Furthermore it is difficult to fix a diametrical dimension of a hole portion of a metallic mold for inserting a movable pin. When a clearance between an outer circumferential face of a movable pin and an inner face of a metallic mold hole portion is too small, the movable pin is not able to move smoothly, and if the clearance is too large, rubber is possible to outflow from this clearance.

When manufacturing a golf ball by the second method, the metallic mold is opened after molding a half outer layer body and the adhesion of the half outer layer body either to convex mold or to a concave mold is unpredictable, and the method is impossible to mass-produce golf balls. The third method only differs from the second method for having the sheet appearance half outer layer body, and this method has the same defects as the second method.

BRIEF SUMMARY OF THE INVENTION

It is therefore an object of the present invention to provide an apparatus and a method for manufacturing a golf ball wherein these problems are solved and are able to mass-produce high quality golf balls having multilayer structures.

The present invention includes a pair of unvulcanized half outer layer bodies are formed by metallic molds provided with first mold having a hemispherical convex portion and second mold having a hemispherical concave portion. A vulcanized inner core is put into either of half outer layer bodies, and a pair of half outer layer bodies are paired up to form a preparatory form which is to be vulcanization molded in metallic molds for vulcanization molding.

BRIEF DESCRIPTION OF THE DRAWINGS

The present invention will be described with reference to the accompanying drawings, in which:

FIGS. 1A, 1B and 1C are respectively a schematic view of a golf ball according to the present invention;

FIGS. 2A and 2B are respectively a schematic view of a method of manufacturing a golf ball;

DESCRIPTION OF THE PREFERRED EMBODIMENTS

Preferred embodiments of the present invention will now be described with reference to the accompanying drawings.

Figure 4:
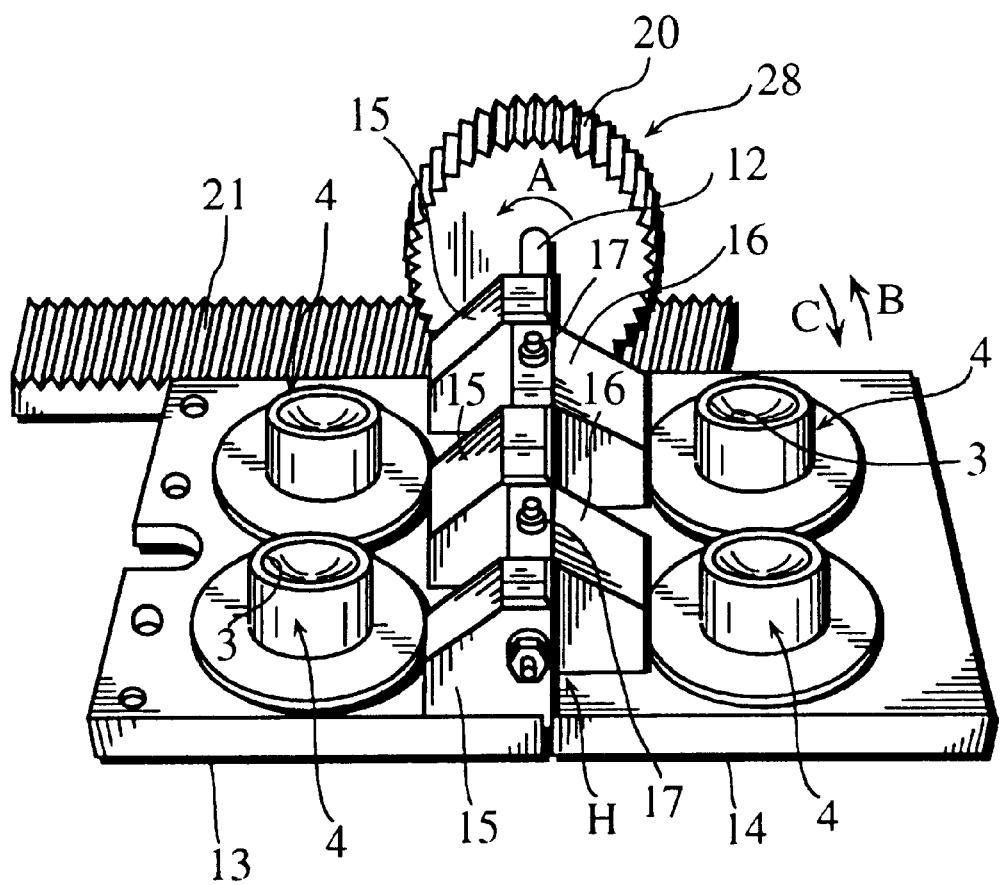
FIG. 4 is an perspective view of a device for folding.
Figure 5:
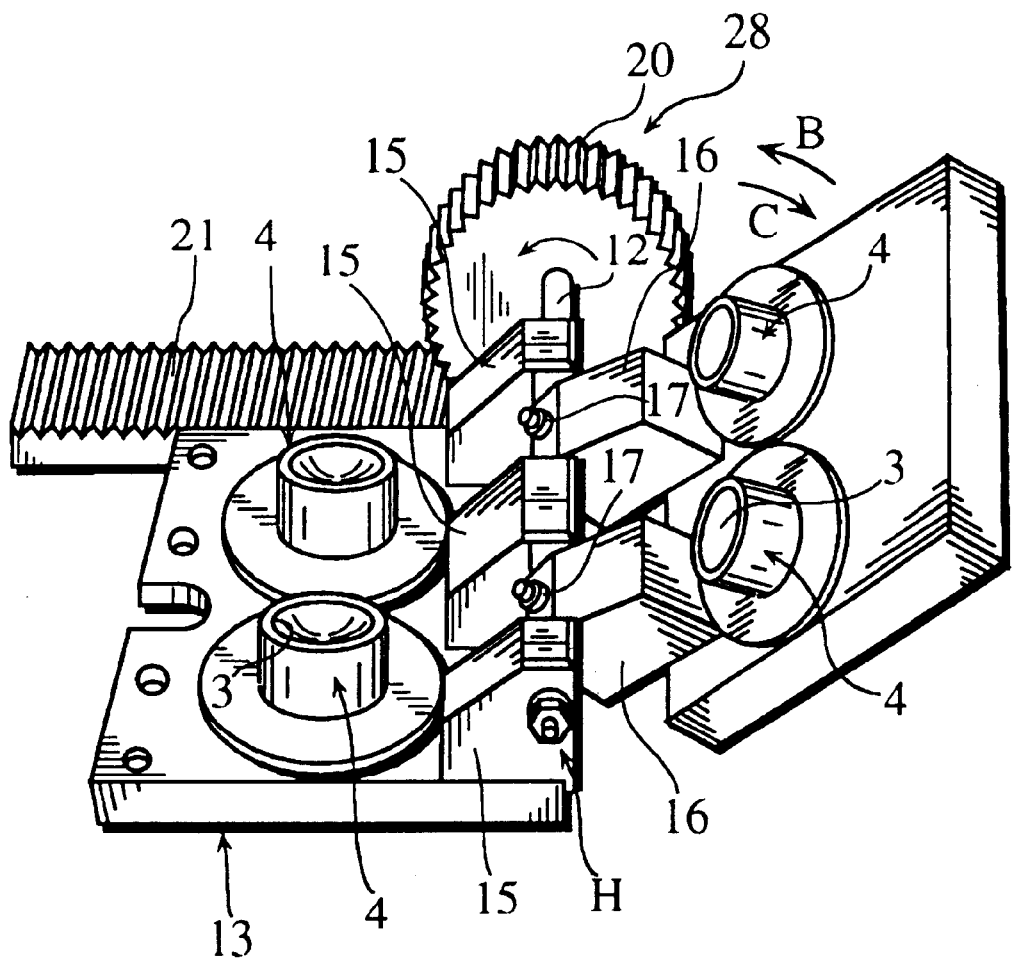
FIG. 5 is an perspective view of the device for folding.

FIG. 1 and FIG. 2 show a method for manufacturing a golf ball according to the present invention. This method comprises the steps of wrapping a vulcanized inner layer (inner core 23) with unvulcanized outer layers 24 by metallic molds for preparatory forming (second mold 4 described later) and vulcanization molding the outer layers and the inner layer by the metallic mold for vulcanization molding to manufacture a product (a golf ball of a multilayer structure). The metallic molds possess a cavity shaped different from a cavity of a metallic mold for vulcanization molding (not shown) to form a preparatory form $S_1$. Specifically a metallic mold apparatus shown in for example, FIGS. 4 and 5 is used for preparatory forming.

A metallic mold device comprises a metallic mold 5, as shown in FIGS. 1 and 2, having a first mold 2 possessing a hemispherical convex portion 1 and a second mold 4 having a hemispherical concave portion 3. The first mold 2 and the second mold 4 form a cavity 10 which is hemispherical shaped as shown in FIG. 1B. A radius of curvature 100 (See FIG. 3) of a convex portion 1 of the first mold 2 is smaller than a radius of an inner core 23 described later.

The second mold 4 comprises a mold main body 6 and a slide object 7 which fits into the mold main body 6. On the mold main body 6, a hole portion 8 is formed comprising a small diameter portion 8a, a middle diameter portion 8b and a large diameter portion 8c where a concave spherical face is formed. The slide object 7 slidably fits to this hole portion 8. The slide object 7 possesses a shaft portion 7a and a head portion 7b which is formed at end of the shaft portion 7a. The head portion 7b is fit into the middle diameter portion 8b of the mold main body 6. On upper surface of the head portion 7b of the slide object 7, a depression 9 which provides a concave spherical surface is formed.

Figure 3:
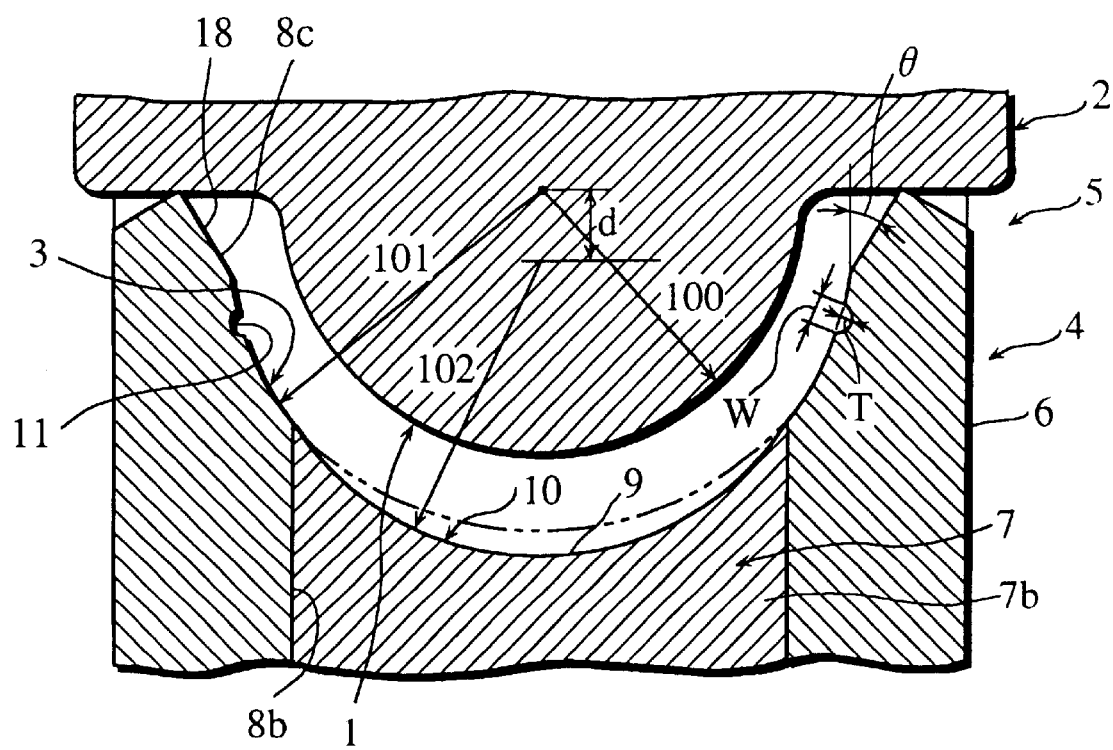
FIG. 3 is an enlarged sectional view of a principal portion of a metallic mold.

As shown in FIG. 3, a radius of curvature 101 of the large diameter portion 8c of the mold main body 6 is fixed to be greater than a radius of curvature 102 of the depression 9 of the head portion 7b of the slide object 7. When the slide object 7 is fit into the mold main body 6, the large diameter portion 8c and the depression 9 are located continuously. Thus, two concave curved surfaces respectively have their own radius of curvatures on a concave portion 3 of a second mold 4. On an inner surface of the concave portion 3 of the second mold 4 (the inner surface of the large diameter portion 8c of the mold main body 6, to be specific), a circumferential groove 11 is molded. The circumferential groove is for example, 0.5 mm to 2.0 mm in width W, and 0.1 mm to 1.2 mm in depth T. As many of the circumferential grooves as is desired can be formed. On an upper opening portion of the concave portion 3 of the second mold 4, a taper 18 which opens widely toward the outside is formed.

The slide object 7 is pushed up as shown in FIG. 2B by a pushing up mechanism (not shown) and the head portion 7b thereof is slipped out from the middle diameter portion 8b of the hole portion 8 of the mold main body 6. The pushing up mechanism is constructed, for example, by a cylinder mechanism. The first mold 2 rises and falls by, for example, a pressing device. When the mold 2 is in a descended position, the mold forms a cavity 10 together with the second mold 4.

The metallic mold apparatus mentioned above process a pair of bases 13, 14 which are respectively provided with two pieces of first molds 4 of the metallic mold 5. The pair of bases 13, 14 are adapted to be movable by a device for folding 28 having a hinge mechanism H.

That is to say, on upper surface of the base 14, a plurality of blocks 15 (In FIGS. 4 and 5, number of blocks 15 are three but blocks to be constructed are not restricted to be three) are formed and on upper surface of the base 13, a plurality of blocks 16 (In FIGS. 4 and 5, number of blocks 16 are two but blocks to be constructed are not restricted to be two) are formed. The blocks 16 are placed between the blocks 15, and a shaft 12 is inserted into the blocks 15, 16. A fastening 17 (for example, a bolt) fastens the block 16 to the shaft 12. When the shaft 12 is rotated in the direction of arrow A, the base 14 moves in the direction of arrow B and second molds 4 of the base 14 are put above second molds 4 of the base 13. Thus, the hinge mechanism H includes the shaft 12 and the blocks 15, 16.

A device for folding 28 is provided with a pinion 20 and a rack 21 which is engaged with the pinion 20. The pinion 12 is continuously formed next to the shaft 12, and the rack 21 is reciprocated by a reciprocating mechanism (not shown). The pinion 20 rotates on the shaft 12, and corresponding to this rotation, the base 14 moves in the direction of arrows B and C.

A pair of molds 4 corresponding to each other are united as shown in FIG. 2A and concave portions 3 of the molds 4 are put together to form a cavity 63, which puts half outer layer bodies 22 together to form a preparatory form $S_1$.

The number of second molds 4 to be respectively attached to each of base 13, 14 is not limited to be two and the number thereof is free to be increased or decreased as desired. A metallic mold apparatus having a plurality of pair of bases 13, 14 which second molds 4 are formed can be used.

Next, explained below is a method for manufacturing a golf ball using the metallic mold apparatus described above.

First, as shown in FIG. 4, the base 13 and the base 14 are horizontally supported (i.e. the concave portions 3 of the second molds 4 of the metallic molds 5 are opened upwardly). As shown in FIG. 1A, after casting short cylindrical or discoid materials (raw rubber) S for forming the outer layer into each of the concave portions 3 of each of the second molds 4, the first mold 2 is lowered. As shown in FIG. 1B, a cavity 10 is formed by this first mold 2 and the second mold 4, and an unvulcanized half outer layer body 22 is molded. The amount of time for pressing in this situation is for example, approximately 5 seconds. After that, the first mold 2 is raised. Once the first mold 2 is raised, depending on the form of the concave portion 3 of the second mold 4, the molded half outer layer body 22 adheres to the second mold 4.

A residual stress in material (raw rubber) S must be removed, and it is desirable that the material is treated by heating without transformation and vulcanization of rubber. As a condition of the heat treatment, when a heating temperature is X° C., it is preferable that the material is heated for $2 \times 2^{((140-X)/10)}$ minutes. Precisely, it is heated by a temperature of 40° C. to 140° C. for 2 minutes to 35 hours.

Next, as shown in FIG. 1C, a vulcanized inner core 23 is inserted into the half outer layer body 22 of the second mold 4 (on base 13 side). The second mold 4 and a corresponding second mold 4 of the other metallic mold 5 (a half outer layer body 22 is adhered to this second mold 4) is put together as shown in FIG. 2A, and an unvulcanized golf ball (a preparatory form $S_1$) is formed. To be specific, the rack 21 is driven and the pinion 20 is rotated to move the base 14 and the corresponding second molds 4 are paired up to form a preparatory form $S_1$ in the cavity 63. Pressure is applied to the second mold 4 by a press apparatus (not shown) which makes the first mold 2 ascend and descend. An amount of time for pressurizing is for example, approximately 10 seconds. The radius of curvature 100 of the convex portion 1 of the first mold 2 is arranged, as described above, smaller than a radius of the inner core 23, and adhesiveness between the inner core 23 and the outer layer 24 which is to be formed increases. The difference between the radius of curvature 100 of the convex portion 1 and the radius of the inner core 23 is preferred to be 2 mm or less. If the difference exceeds 2 mm, excessive force which causes eccentricity between the outer layer 24 and the inner core 23 is generated when the outer layers are pressed together.

In concrete terms, a diameter $r_1$ of the convex portion 1 of the first mold 2 arranged to be 0.9 mm $\leq r_1 \leq$ 19 mm, and a diameter $r_2$ of the inner core 23 arranged to be 1 mm $\leq r_2 \leq$ 19 mm are restricted as shown in the following Formula 1:

$$0.10 \geq \frac{r_2 - r_1}{r_2} \geq 0 \qquad \text{Formula 1}$$

When a diameter $r_0$ of a vulcanization molded outer layer 24 is fixed as 18.4 mm $\leq r_0 \leq$ 19.8 mm, a diameter $r_2$ of the inner core 23 is arranged to be $r_0 > r_2$, a radius of a depression 9 is expressed as $r_3$, and an amount of offset of the radius $r_3$ is arranged to be $3 \leq d_3 \leq 8$, a radius of a large diameter portion 8c is expressed as $r_4$, and an amount of offset of the radius $r_4$ is fixed to be $1 \leq d_4 \leq 3$ and, $d_4 + 2 \leq d_3$, so that $r_3 + d_3 > r_4 + d_4 > r_0$ is to be satisfied.

After a preparatory form $S_1$ is molded, the rack 21 is driven and the pinion 20 is rotated for moving the base 14 and for opening the corresponding second molds 4. As shown in FIG. 2B, the slide object 7 is raised, an unvulcanized golf ball (the preparatory form $S_1$) is taken out from the second mold 4, and the preparatory form $S_1$ is vulcanization molded by a metallic mold for vulcanization molding (not shown) for molding golf balls (products).

By using the metallic mold for manufacturing a golf ball as mentioned above, putting materials into the second molds 4 is performed without difficulty because the concave portions 3 of the second molds 4 are upwardly opened, and there is no need for removing from the second molds 4 of the metallic mold 5 to a metallic mold for preparatory molding, because the second molds 4 of the metallic mold 5 for molding half outer layer bodies can be also used as a metallic mold for preparatory molding a pair of paired up half outer layer bodies 22, and thus, the operation efficiency for manufacturing a golf ball improves.

The circumferential groove 11 is provided on the inner surface of the concave portion 3 of the second mold 4, and thereby, rubber flows into the circumferential groove 11 when the half outer layer body 22 is molded. As the metallic molds are opened, the half outer layer body 22 sticks to the second mold 4 side for certain. As described above, the width W of the circumferential groove 11 is arranged to be 0.5 mm to 2.0 mm and thickness T thereof is fixed to be 0.1 mm to 1.2 mm. If the width W is less than 0.5 mm and the thickness T is less than 0.1 mm, a part of rubber which catches the half outer layer body 22 turns out to be small. Conversely, if the width W is more than 2.0 mm and the thickness T is more than 1.2 mm, the circumferential groove is so large that taking out a preparatory form $S_1$ from the mold becomes difficult.

When the preparatory form is taken out from the mold, the slide object 7 of the second mold 4 is pushed up, and the preparatory form $S_1$ is not given excessive force and is brought out easily and reliably, without transformation.

Next, Table 1 shows examples of the present invention (in case an outer layer 24 having radius of 19.83 mm is provided around an inner core 23 having a radius of 12 mm).

As a first example (example 1) of the invention, the curvature of radius 100 of the convex portion 1 is arranged to be 11.5 mm, the curvature of the radius 101 of the large diameter portion 8c is fixed to be 19 mm, and the curvature of radius 102 of the depression 9 is arranged to be 17 mm. The metallic mold 5 has an eccentricity d of a central point of a radius of curvature 102 of the depression 9 and the radius of curvature 100 of the convex portion 1 is arranged to be 6 mm when the first mold 2 and the second mold 4 are united. Manufacturing golf balls (products) by using the metallic mold 5, inspecting conditions of products, and results of inspections are shown in Table 1. In this case, on the concave portion 3 of the second mold 4, the circumferential groove 11 is formed and the second molds 4 are also used as metallic molds for bonding half outer layer bodies together after setting an inner core therein.

TABLE 1

|  | example 1 | example 2 | example 3 | conventional example 1 | conventional example 2 | conventional example 3 |
|---|---|---|---|---|---|---|
| number of gulf balls produced per 1 hour/per 1 apparatus (regard a core method as 100) | 213 | 213 | 213 | 53 | 24 | 100 |
| adhesion on convex portion side (number) | 0/600 | 0/600 | 0/600 | — | — | 498/600 |
| eccentricity (mm) (average) | 0.25 | 0.30 | 0.28 | 0.39 | 0.40 | 0.41 |
| depression on surface (number) | 0/600 | 0/600 | 0/600 | 3/600 | 16/600 | 37/600 |
| adhesion between layers | good | good | good | good | good | normal |

As a second example (example 2) of the invention, the curvature of radius 100 of the convex portion 1 is arranged to be 11.25 mm, the curvature of radius 101 of the large diameter portion 8c is fixed to be 18.5 mm, and the curvature of radius 102 of the depression 9 is arranged to be 16.5 mm. The metallic mold 5 has an eccentricity d of a central point of the radius of curvature 102 of the depression 9 and the radius of curvature 100 of the convex portion 1 arranged to be 8 mm when the first mold 2 and the second mold 4 are united. Manufacturing golf balls (products) by using the metallic mold, inspecting conditions of products, and results of inspections are shown in Table 1. In this case, on the concave portion 3 of the second mold 4, the circumferential groove 11 is formed and the second molds 4 are used as metallic molds for sticking half outer layer bodies together after setting an inner core therein.

As a third example (example 3) of the invention, the curvature of radius 100 of convex portion 1 is arranged to be 11.75 mm, the curvature of radius 101 of the large diameter portion 8c is fixed to be 18.5 mm, and the curvature of radius 102 of the depression 9 is arranged to be 17.5 mm. The metallic mold 5 has an eccentricity d of a central point of the radius of curvature 102 of the depression 9 and the radius of curvature 100 of the convex portion 1 arranged to be 8 mm when the first mold 2 and the second mold 4 are united. Manufacturing golf balls (products) by using a metallic mold 5, inspecting conditions of products, and results of inspections are shown in Table 1. In this case, the second molds 4 are also used as metallic molds for bonding half outer layer bodies together after setting an inner core therein, but the circumferential groove 11 is not formed on the concave portion 3 of the second mold 4.

In example 1 of the invention, the radius of the inner core 23 is fixed to be 0.5 mm smaller than the radius of curvature 100 of the convex portion 1. In example 2 of the invention, the radius of the inner core 23 is fixed to be 0.75 mm smaller than the radius of curvature 100 of the convex portion 1. In example 3 of the invention, the radius of the inner core 23 is fixed to be 0.25 mm smaller than the radius of curvature. 100 of the convex portion 1.

In comparison, golf balls manufactured using the conventional method are inspected and results are shown as conventional examples 1, 2, 3. Conventional example 1 is the first method described as a prior art and an injection molding machine is used in this method. Conventional example 2 is the first method described as a prior art and a transfer metallic mold is used. Conventional example 3 is the second method described as a prior art. Golf balls of the conventional examples are respectively manufactured by the conventional method.

In Table 1, the number of golf balls manufactured per hour, per an apparatus obtained in conventional example 3 is 100. It is apparent that examples of the present invention can produce numerous balls, thus proving the efficiency of the present inventions. Adhesion of a half outer layer body to a first mold having a convex portion did not occur in examples of the present invention. However, in conventional example 3, 498 balls out of 600 balls had the adhesion to the first mold. Efficiency in operation of the present invention is proved with this result. With regard to an amount of eccentricity, the result of examples of the present invention is approximately 0.1 mm less than the results of conventional examples. Balls with a recess on the surface were not found in examples of the present invention. However, 3 out of 600 balls in conventional example 1, 16 out of 600 balls in conventional example 2, and 37 out of 600 balls in conventional example 3 were recessed on the surface.

The number of golf balls manufactured per hour, per an apparatus are calculated as shown below.

(Number of golf balls produced per an apparatus in a cycle)×
(cycles per an hour)

Figure 6:
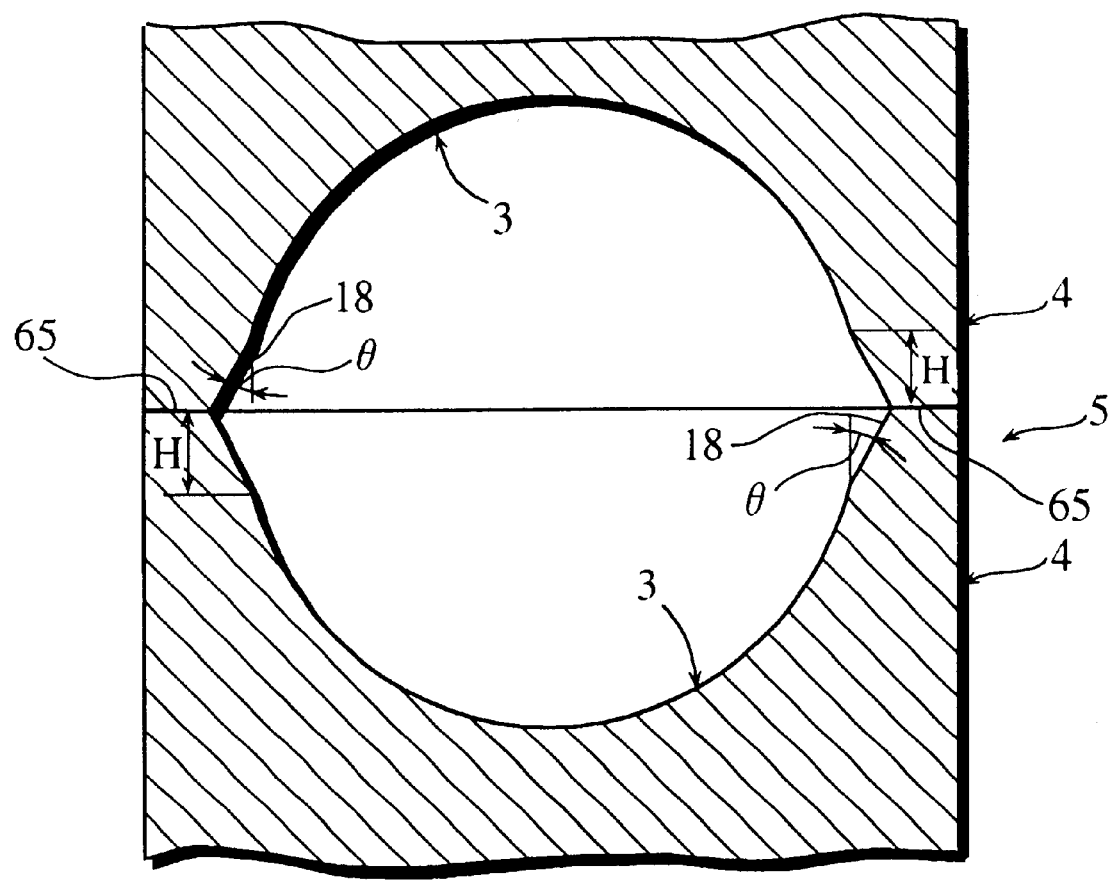
FIG. 6 is a schematic sectional view of a principal portion of paired up second molds.

An angle of inclination θ of the taper 18 is arranged to be not less than 25° but below 30° as shown in FIG. 6. The taper 18 is provided at a location H which is specifically not less than 2.0 mm but 8.0 mm or less from a joining face 65 of the mold 4. The angle of inclination θ is an angle of inclination to a center line of the metallic mold.

Figure 10A:
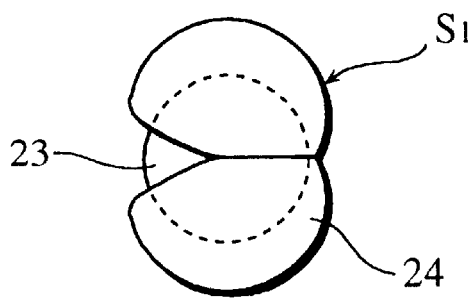
FIGS. 10A, 10B and 10C are respectively a schematic view of a comparative method for manufacturing a golf ball.

If there is a subtle transformation or inequality in thickness of unvulcanized layers (half outer layer bodies 22) of a preparatory form $S_1$, when the molds are closed while press vulcanization molding the half outer layer bodies 22, rubber is apt to flow to a thick part of the unvulcanized layers as compared to a thin part thereof. The thick part gets thicker and thin part becomes thinner, thus causing a great eccentricity of vulcanized inner core 23. When molding an unvulcanized golf ball (a preparatory form $S_1$), by using a mold not provided with taper 18 on an inner circumferential rim of the opening of the concave portion 3 and putting the half outer layer bodies 22 together, as shown in FIG. 10A, with the passage of time, the outer layer bodies shrink, and adhered parts are separated and a so called opening occurs and eccentricity of the vulcanized inner core 23 is caused.

Figure 10B:
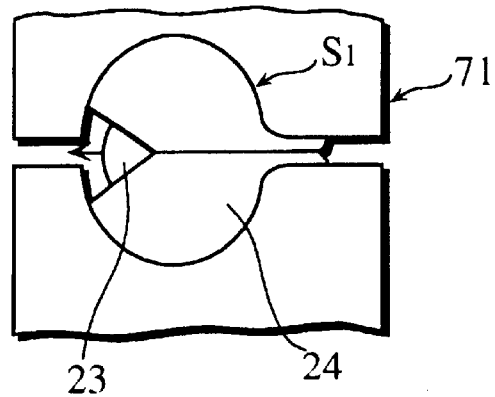
Figure 10C:
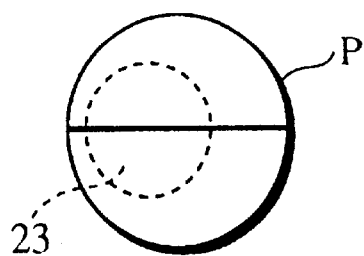

If the outer layer bodies are vulcanization molded while the outer layer bodies are opened, as shown in FIG. 10B, rubber between the opening portion and the opposite side thereof flows so well that the inner core 23 is pushed off to the opening side, and the inner core 23 of a product P becomes eccentric as shown in FIG. 10C.

According to the present invention, the molds 4 having the taper 18 on inner circumferential rim of the opening of the concave portion 3 are used. When putting half outer layer bodies together, a seam portion 25 which swells out and forms an outer blade is formed on a joining face portion (equator portion) of a preparatory form $S_1$. Therefore, the bonding area becomes large and even with the passage of time. Accordingly, part of the bonding area will not open (will not be a condition of opening). However even with this case, if there is an unequal portion of rubber volume of seam portion 25, rubber flows to enlarge the unequal portion when vulcanization pressing, and induces eccentricity of the inner core 23. That is to say, the less the rubber volume of the seam portion 25, the less the chance of inducing eccentricity. However, a small volume of rubber in the seam portion 25 causes an easy opening and a separating of the seam portions.

The volume of rubber in seam portion 25 needs to be optimized. For instance, the angle of inclination θ of the taper 18 can be arranged to optimize the volume of rubber in the seam portion 25.

To be specific, when the angle of inclination θ of the taper 18 is less than 25° or when the taper 18 is formed at a location below 2.0 mm from the joining face, the joining area is insufficient and an opening and eccentricity of the bonded surfaces are induced. On the other hand, when the angle of inclination θ of the taper 18 is 30° or more or when the taper 18 is formed at a location over 8.0 mm from a joining face, rubber in the seam portion 25 becomes excessive in volume and rubber flows too much and induces eccentricity.

To avoid separating the bonding faces of the half outer layer bodies 22 without forming the seam portion which expands like an outer blade, using an adhesive agent or extending the amount of time of applying pressure can be thought of. However using of the bonding agent becomes a cause for producing products of varying quality, and increases another process of manufacturing, such as increased costs and extended amounts of time for pressurizing, which leads to decreased productivity.

Figure 7:
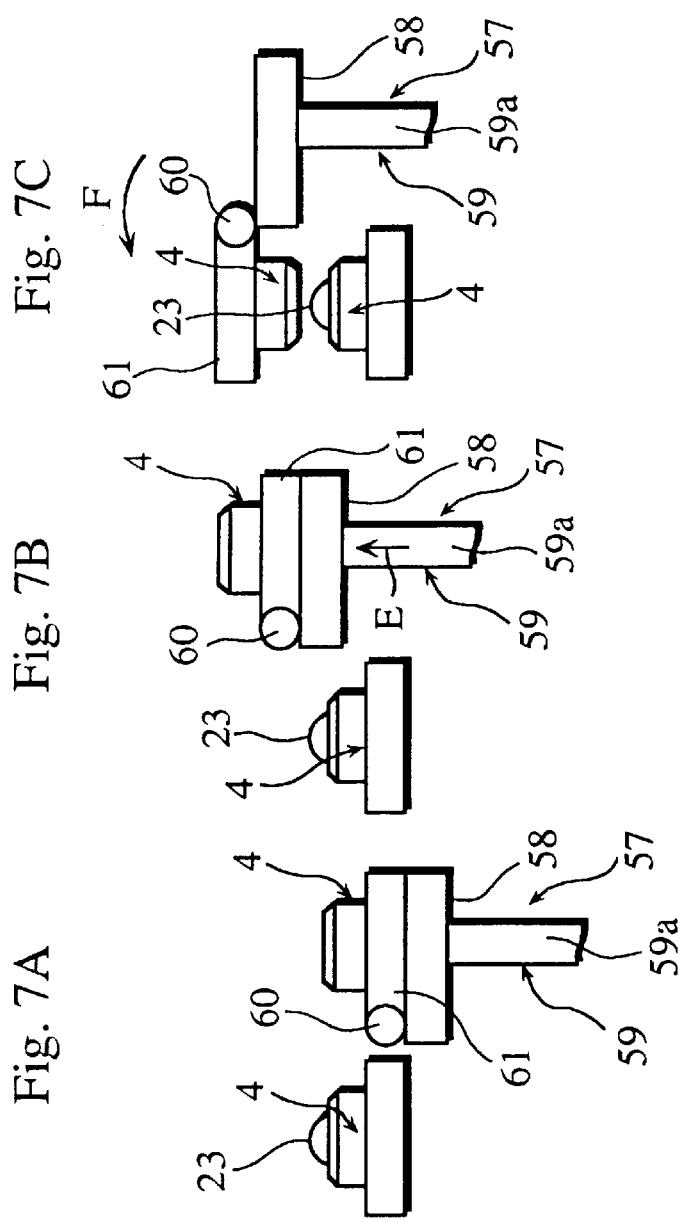
FIGS. 7A, 7B, 7C and 7D are respectively a schematic view of a pairing up mechanism.

A mold of a pair of molds 4 can be movable through the pairing up mechanism 57 as shown in FIGS. 7A to 7 D. The pairing up mechanism 57 comprises for example, a propping mount 58 for receiving a base 61 supporting the mold 4 movable through a shaft 60, and a cylinder 59 which makes the propping mount 58 descend and ascend. Therefore, a piston rod 59a of the cylinder 59 is elongated in the direction of arrow F in FIG. 7B and makes the propping mount 58 and the mold 4 rise as illustrated in the FIGS. 7A to 7B. After that, as shown in FIG. 7C, the mold 4 is moved on an axis 10 in the direction of arrow F, and a mold 4 can be positioned right above the other mold 4 so that the concave portions 3 thereof respectively face each other. As shown in FIG. 7D, the piston rod 59a of the cylinder 59 is lowered in the direction of arrow G and the pair of molds 4 can be put together. Therefore, a pairing up mechanism 57 makes it possible to lower one mold 4 vertically toward the other mold 4. When the molds 4 are put together as shown in FIG. 7D, a stopper (not shown) is provided to control the base 61 so as not to move on the axis 60.

Thus, the mold 4 without the vulcanized inner core 23 is lowered vertically to pair up together with the other mold 4 having the vulcanized inner core 23 by the pairing up mechanism 57.

A direction for pressurizing can be arranged to be vertical and an inequality of pressure on uniting molds can be prevented, and a preparatory form $S_1$ which is to be formed is not opened on a joining face and an vulcanized inner core 23 does not become eccentric.

Figure 8:
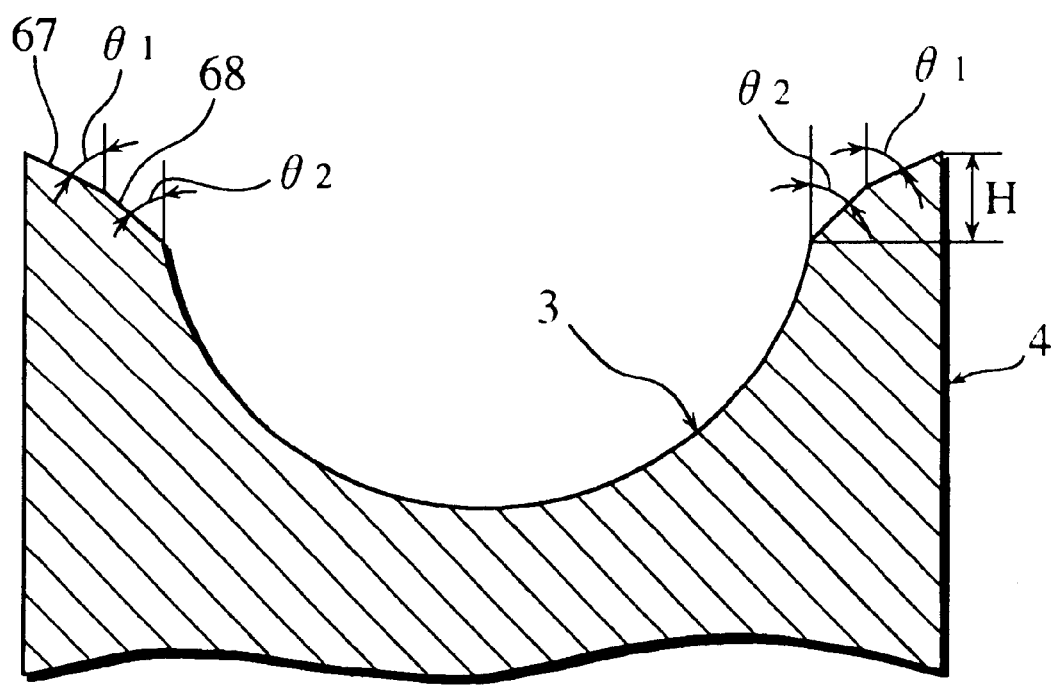
FIG. 8 is a schematic sectional view of a principal portion of second mold of another apparatus for manufacturing a golf ball.
Figure 9:
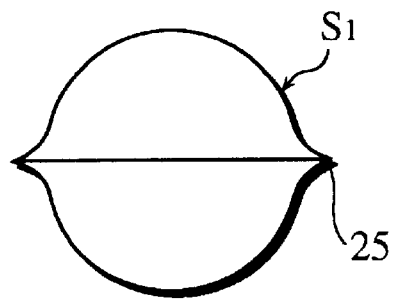
FIG. 9 is a schematic view of a preparatory form.

FIG. 8 shows another embodiment of the present invention. In this case, on an inner circumferential rim of the opening of the concave portion 3, a first taper 67 and a second taper 68 are formed. The first taper 67 on an outer side and the second taper 68 on an inner side are formed successively.

An angle of inclination $\theta_1$ of the first taper 67 is arranged to be larger than an angle of inclination $\theta_2$ of the second taper 68 and the angle of inclination $\theta_1$ is arranged to be not less than 30° but less than or equal to 80°. The first taper 67 and the second taper 68 are formed at a location which ranges 0.5 mm or more and 8.0 mm or less from a joining face 65 of the mold 4.

Therefore, a seam portion 25 which possesses an optimum volume of rubber is formed on a preparatory form $S_1$ by using the mold 4. If an angle of inclination $\theta_1$ of the first taper 67 is arranged to be below 30° or formed at a location below 0.5 mm from the joining face, the bonding area is too small to cause an opening of seam portion or to induce an eccentricity. If an angle of inclination $\theta_1$ of the first taper 67 is arranged to be more than 80° or if the taper 67 is formed at a location more than 8.0 mm from the joining face, the rubber volume of the seam portion 25 becomes too large and rubber flows too much, thus inducing an eccentricity. If an angle of inclination $\theta_1$ of the first taper 67 is arranged to be smaller than an angle of inclination $\theta_2$ of the second taper 68, flow of rubber to an opening portion is too much and causes an eccentricity when the molds are closed when press vulcanizing.

Material S is preferable to be heated within the limits such that transformation of the material is not caused and vulcanization of rubber is not caused, and the heating of the material is possible to reduce opening of bonded outer layers and eccentricity remarkably. The amount of time for this heat treatment differs depending on temperature for heating because the relaxation mechanism of the residual stress includes thermal activation of polymer molecule movement, and the amount of time for treatment is arranged to be an Arrhenius type and it is set to be $2 \times 2^{((140-x)/10)}$ minutes as described above. That is to say, if the temperature is arranged to be over 140°, a so called burn occurs and if it is below 40°, the amount of time for treatment becomes too long and lowers productivity. Regarding the amount of time for heat treatment, it is not possible to transfer heat into the inner layer sufficiently if the time is below 2 minutes. And conversely, it causes lowering in productivity if the time is over 35 hours.

To ensure that the half outer layer 22 adheres to the mold 4 side and to improve efficiency of productivity of late manufacturing process, a circumferential groove is preferred to be formed on the inner surface of the concave portion 3 of the mold 4 as shown in FIG. 8.

Results of examples of the invention are shown below.

Various molds 4 are formed to manufacture golf balls, and a percentage (%) of opening occurred to the balls, and an amount of eccentricity (mm) of the balls were inspected as shown in examples 4 to 9 of the present invention, as set forth in Table 2. In the examples, 60 balls are checked in each experiment respectively.

TABLE 2

|  |  | example 4 | example 5 | example 6 | example 7 | example 8 | example 9 |
|---|---|---|---|---|---|---|---|
| Condition | Taper | 1 stage 28.4° | 2 stages first taper 66.4° second taper 28.4° | 1 stage 11.3° | 1 stage 11.3° | 1 stage 11.3° | 1 stage 11.3° |
|  | Pairing up Mechanism | No | No | Yes | No | No | No |
|  | Heating Treatment | No | No | No | 80° C. × 1 hr | 40° C. × 34 hrs | 130° C. × 5 mins |
| Percentage (%) of opening of bonded outer layers (n = 60) |  | 1 | 2 | 2 | 4 | 5 | 6 |
| Eccentricity (mm) (n = 60) |  | 0.22 | 0.35 | 0.31 | 0.32 | 0.33 | 0.35 |

In Table 2, in the column of Taper, "1 stage" means that one taper 18 was formed and "2 stages" means that, as shown in FIG. 8, first and second tapers 67, 68 were formed. In each of examples 4 to 9 of the invention, there was little occurrence of opening, and the amount of eccentricity was slight.

For purposes of comparison, as shown in comparative examples 1 to 6 in Table 3, various molds are formed for manufacturing golf balls, and a percentage (%) of the balls whose joining face opened, and the amount of eccentricity (mm) of the balls were inspected. 60 balls were checked in each experiment respectively. In Table 3, in column of Taper, "1 stage" means that one taper 18 was formed and "2 stages" mean that, as shown in FIG. 8, first and second tapers 67, 68 were formed.

TABLE 3

|  |  | comparative example 1 | comparative example 2 | comparative example 3 | comparative example 4 | comparative example 5 | comparative example 6 |
|---|---|---|---|---|---|---|---|
| Condition | Taper | 1 stage 11.3° | 1 stage 43.2° | 2 stages first taper 83° second taper 28.4° | 2 stages first taper 28.4° second taper 43.2° | 1 stage 11.3° | 1 stage 11.3° |

TABLE 3-continued

|  | comparative example 1 | comparative example 2 | comparative example 3 | comparative example 4 | comparative example 5 | comparative example 6 |
|---|---|---|---|---|---|---|
| Pairing up Mechanism | No | No | No | No | No | No |
| Heating Treatment | No | No | No | No | 80° C. × 1 min | 35° C. × 40 hrs |
| Percentage (%) of opening of bonded outer layers (n = 60) | 34 | 4 | 3 | 45 | 68 | 42 |
| Eccentricity (mm) (n = 60) | 0.51 | 0.65 | 0.62 | 0.55 | 0.57 | 0.61 |

As shown in Table 3, in comparative example 1, the angle of inclination of the taper was below 25° and the percentage of the balls whose bonded faces were opened was as great as 34%, and the amount of eccentricity was also as large as 0.51 mm. In comparative example 2, the angle of inclination of the taper was 30° or more and the percentage of opening among the balls was small, however the amount of eccentricity was as great as 0.65 mm. In comparative example 3, the angle of inclination of the first taper was over 80° and the percentage of opening bonded outer layers of the balls was small, however the amount of eccentricity was as great as 0.62 mm. In comparative example 4, the angle of inclination of the first taper was below 30° and angle of inclination of the second taper was greater than the angle of inclination of the first taper, the percentage of opening of the bonded outer layers of the balls was as great as 45%, and the amount of eccentricity was also as great as 0.55 mm. In comparative example 5, the angle of inclination of the first taper was below 25° and the material was heated at 80° C. for as short a time as 1 minute and the percentage of opening of the balls was as great as 68%, and the amount of eccentricity was also as great as 0.57 mm. In comparative example 6, the angle of inclination of the first taper was below 25° and material was heated at 35° C. for 40 hours, and the percentage of opening of the balls was as great as 42%, and the amount of eccentricity was also as great as 0.61 mm.

According to the present invention, a multilayer golf ball having an inner core (inner layer) of which eccentricity is small can be manufactured by a simple method with reliability and at a low cost, and golf balls can be mass-produced. By using a first mold processing a hemispherical convex portion and a second mold processing a hemispherical concave portion, golf balls without depression on surfaces or without faulty bonding layers can be produced without difficulty and with reliability.

Using a mold which is provided with at least 2 kinds of concave curved surfaces respectively having a different radius of curvature, a pulsing stream of rubber is used to prevent a residual air layer which causes depressions on surfaces of the products. Thus it is possible to manufacture products without depressions. Using a metallic mold processing a convex portion with a radius of curvature thereof being less than or equal to the radius of the vulcanized inner core, it is possible to reliably bring outer layers into intimate contact with an inner core.

When the mold having a circumferential groove on an inner surface of a concave portion is used, after forming a half outer layer body, and as the mold is opened, the half outer layer body is adhered to the second mold side for every time, which facilitates subsequent processes.

Second molds, which are to be united while having concave portions on which half outer layer bodies are adhered, can be used as a metallic mold for bonding half outer layer bodies after setting an inner core therein, and the efficiency of manufacturing products improves, and it is possible to simplify a whole construction of the mold because it does not require another mold for bonding half outer layer bodies together.

Using an apparatus having a device for folding, when material is put into a metallic mold, a concave portion of second mold can be upwardly opened and materials are reliably placed into molds without difficulty.

An apparatus possessing a taper or two on an inner circumferential rim of an opening of a concave portion of the mold prevents an adhered surface from being separated, while reliably preventing eccentricity of inner core. Thus, it is possible for the apparatus to manufacture golf balls of high quality.

An apparatus having a mechanism putting a pair of molds together can cover a vulcanized layer with an unvulcanized layer with an uniform pressure, thus preventing the opening of the bonded outer layers and remarkably reducing eccentricity. If material made of raw rubber is heated in advance, eccentricity of an inner core can be prevented without fail, opening of the bonded outer layers can be reduced, and golf balls are manufactured without using a large apparatus. If the temperature of heating is X and if material S which is made of raw rubber is heated for $2 \times 2^{((140-x)/10)}$ minutes, a burn will not be caused, and the time for manufacturing win not be too long and productivity of the manufacturing apparatus is improved.

While preferred embodiments of the present invention have been described in this specification, it is to be understood that the invention is illustrative and not restrictive, because various changes are possible within the spirit of the indispensable features.

What is claimed is:

1. An apparatus for manufacturing a golf ball, comprising:

a pair of molds, each mold having a hemispherical concave portion which acts as a cavity for uniting half outer layer bodies to wrap a vulcanized inner core therein when each of said molds are put together after the half outer layer bodies are fixed to the molds, said hemispherically concave portion being shaped differently from a cavity of separate molds for vulcanization molding of the united half outer layer bodies having said vulcanized inner core therein, and each of said hemispherical concave portions having an inner circumferential rim with a taper to form part of a seam on the united half outer layer bodies having said vulcanized inner core therein, wherein said taper is arranged to optimize the volume of the material of the half outer layer body in said part of said seam.

2. An apparatus for manufacturing a golf ball, comprising:

a pair of metallic molds, each mold having a hemispherical concave portion which acts as a cavity for uniting unvulcanized half outer layer bodies to wrap a vulcanized inner core therein when said molds are folded together, said hemispherical concave portion being shaped differently from a cavity of separate molds for vulcanization molding of the united unvulcanized half outer layer bodies having said vulcanized inner core therein, each of said hemispherical concave portions having an inner circumferential rim with a taper to form part of a seam on the united unvulcanized outer layer bodies having said vulcanized inner core therein, wherein said taper is arranged to optimize the volume of the material of the half unvulcanized outer layer body in said part of said seam; and a device for folding said pair of metallic molds together, which positions one mold of said pair of molds holding one of the unvulcanized half outer layer bodies over the other mold holding both the other one of the unvulcanized half outer layer bodies and the vulcanized inner core.

3. An apparatus for manufacturing a golf ball, comprising:

a pair of metallic molds, each mold having a hemispherical concave portion which acts as a cavity for uniting unvulcanized half outer layer bodies to wrap a vulcanized inner core therein when said molds are paired together, said hemispherical concave portion being shaped differently from a cavity of separate molds for vulcanization molding of the united unvulcanized half outer layer bodies having said vulcanized inner core therein, each of said hemispherical concave portions having an inner circumferential rim with a taper to form part of a seam on the united unvulcanized outer layer bodies having said vulcanized inner core therein, wherein said taper is arranged to optimize the volume of the material of the half unvulcanized outer layer body in said part of said seam; and a pairing mechanism which vertically lowers one mold of the pair of molds holding one of the half outer layer bodies toward the other of said pair of molds holding both the other of the half outer layer bodies and the vulcanized inner core.

4. The apparatus for manufacturing a golf ball as set forth in claim 1, 2 or 3, wherein said taper gradually opens toward the inner circumferential rim of the concave portion at a location which is not less than 2.0 mm, but 8.0 mm or less from a joining face, with an inclined angle θ of said taper being 25° or more but below 30° from the perpendicular.

5. The apparatus for manufacturing a golf ball as set forth in claim 1, 2 or 3, wherein said taper includes successively positioned first and second tapers respectively opening toward the inner circumferential rim of the concave portion at a location which is not less than 0.5 mm, but 8.0 mm or less from a joining face, with an inclined angle for the first taper being greater than an inclined angle of the second taper which is provided inside of the first taper, and the inclined angle of said first taper being 30° and more, but 80° or less from the perpendicular.

6. The apparatus for manufacturing a golf ball as set forth in claim 1, 2 or 3, wherein said hemispherical concave portion has at least 2 different kinds of concave curved portions respectively having different radius of curvature.

7. The apparatus for manufacturing a golf bass as set forth in claim 1, 2 or 3, wherein each of the molds is provided with a circumferential groove on an inner surface of the hemispherical concave portion.

* * * * *